United States Patent [19]

Ishii et al.

[11] Patent Number: 5,027,266

[45] Date of Patent: Jun. 25, 1991

[54] VOLTAGE GENERATOR WITH VOLTAGE MULTIPLIER

[75] Inventors: Takaaki Ishii; Masayuki Sakanishi; Katsuhiko Kita, all of Tokyo, Japan

[73] Assignee: Kabushiki Kaisha Toshiba, Kanagawa, Japan

[21] Appl. No.: 509,150

[22] Filed: Apr. 16, 1990

[30] Foreign Application Priority Data

Apr. 17, 1989 [JP] Japan .................................. 1-96798

[51] Int. Cl.$^5$ ........................ H02M 3/18; H02M 7/00
[52] U.S. Cl. ....................................... 363/63; 363/60; 350/332
[58] Field of Search ....................... 363/59, 60, 61, 63, 363/89; 350/331 R, 332 R

[56] References Cited

U.S. PATENT DOCUMENTS

| | | | |
|---|---|---|---|
| 3,944,908 | 3/1976 | Oki | 363/63 |
| 4,281,377 | 7/1981 | Evans | 363/63 |
| 4,740,878 | 4/1988 | Carter et al. | 363/63 |
| 4,908,752 | 3/1990 | Suzuki et al. | 363/63 |

Primary Examiner—Peter S. Wong
Attorney, Agent, or Firm—Banner, Birch, McKie & Beckett

[57] ABSTRACT

This invention discloses a voltage generator circuit having a voltage regulator and a voltage generator for supplying voltage to a load. The voltage regulator is powered by a power source which supplies a first voltage level and the voltage regulator provides a regulated output at a second voltage level lower than the first voltage level. The voltage generator receives power from the regulated output and provides a multiplied output having a third voltage level. Therefore, any level of voltage between the first voltage level and the third voltage level is available to the load circuit. Since the voltage regulator supplies the voltage generator with power at a regulated level, the voltage level applied to the muliplier may be adjusted for conserving power.

13 Claims, 3 Drawing Sheets

VOLTAGE GENERATOR WITH VOLTAGE MULTIPLIER

FIELD OF THE INVENTION

This invention generally relates to a voltage generator having a voltage multiplier and more specifically to a voltage generator using a semiconductor device such as, for example, a CMOS or FET.

BACKGROUND OF THE INVENTION

Generally display devices such as Liquid Crystal Displays (LCD) used in electronic equipment require high voltage for permitting its operation in a wide range of temperatures. For example, according to technical standards of radio telephones, the radio telephone including its LCD must operate in a temperature range from −30° C. to +60° C. having a voltage difference of 9 v (e.g., −4 v to +5 v).

On the other hand, logic circuitry employed in such electronic equipment usually operates at a fixed voltage of approximately 5 volts. That is, zero voltages for logical "0" and 5 volts for logical "1". Therefore, incorporating logic circuitry and a driver for an LCD display device, it is necessary to provide a negative voltage generator which produces a wider range of voltages from +5 volts for the logic circuitry to a negative potential for providing the requisite voltage difference for the LCD.

A conventional negative voltage generator is shown in FIG. 1. The negative voltage generator comprises a negative voltage generation circuit 101 and a voltage regulator circuit 102. The voltage (5 volts) from a power source (not shown) is applied to negative voltage generation circuit 101, voltage regulator circuit 102, and load 103.

The negative voltage generation circuit 101 comprises a non-stable multivibrator circuit 104 and a voltage multiplier circuit 105. A complementary metal-oxide semiconductor (CMOS) device 106 is employed in the non-stable multivibrator circuit 104 for generating an oscillation pulse signal having a high voltage level of 5 volts and a low voltage level of 0 volts. The purse signal is applied to the voltage multiplier circuit 105. Voltage multiplier circuit 105 produces a signal which is inversely multiplied; that is, a high voltage level of approximately 0 volts and a low voltage of approximately −4 volts are provided in accordance with the applied pusle signal. This signal is applied to an operational amplifier 107 in voltage regulator circuit 102. Voltage regulator circuit 102 outputs a stabilized signal having a voltage, for example, of −4 volts, which is applied to load 103. Therefore, any voltage level from +5 volts to −4 volts is readily available for the LCD load 103.

A drawback of the prior art is that the use of certain semiconductor devices, such as CMOS and FET devices, for the voltage pulse generator result in power dissipation when the device changes states. The larger of the fixed bias voltage applied, the greater the dissipation during switching. Since an LCD circuit requires a particular operational voltage difference, as discussed above, a lower fixed bias voltage cannot be supplied to the semiconductor device in the prior art circuit.

SUMMARY OF THE INVENTION

It is accordingly an object of the present invention to provide an improved voltage generator circuit power consumption is conserved.

It is a further object of the present invention to provide an improved voltage generator circuit wherein the output voltage level is maintained at any desired level.

It is still a further object of the present invention to provide an improved voltage generator circuit suitable for applying voltage to a device incorporating both logic circuiting operating at a voltage range of 0 volts and 5 volts and a driver circuit operating at a wider voltage range, for use with devices such as LCDs.

In achieving these objects, as embodied and described herein, the invention includes a voltage generator circuit having a voltage regulator and a voltage pulse generator. The voltage regulator is powered by a power source which supplies voltage at a first voltage level and the voltage regulator provides a regulated output voltage maintained at a second voltage level lower than the first voltage level. The voltage generator receives from the regulated output of the voltage regulator and provides a multiplied output having a third voltage level. Therefore, any level of voltage between the first voltage level and the third voltage level is available to the load circuit coupled.

The problems and deficiencies of the conventional voltage generator discussed above are solved by the present invention. In accordance with the present invention, the voltage regulator supplies the voltage generator with power at a regulated voltage level. Accordingly, the voltage level applied to the voltage pulse generator may be adjusted in order to conserve power consumption of the semiconductor device used in the pulse generator.

DETAILED DESCRIPTION OF THE PREFERRED EMBODIMENTS

A preferred embodiment of the present invention will be described with reference to the accompanying drawings.

Figure 1:
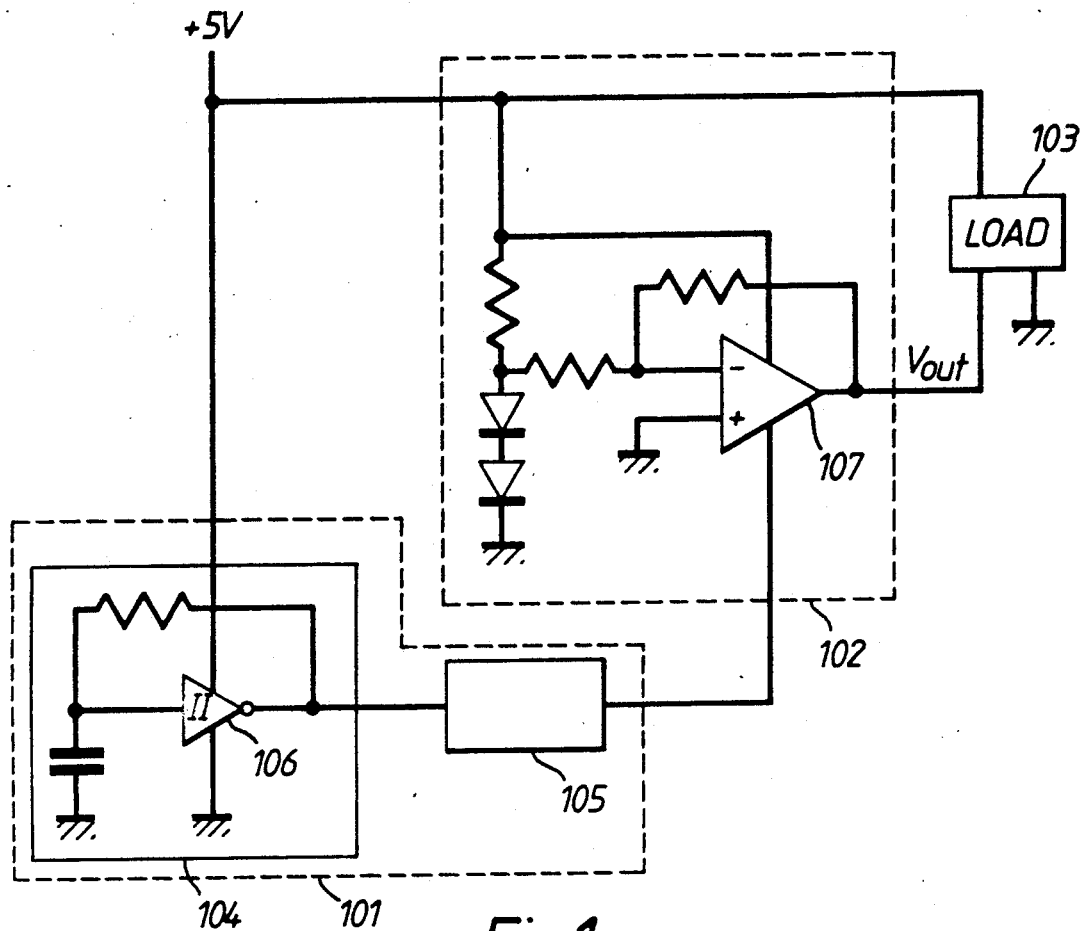
FIG. 1 is a block diagram of a conventional voltage generator.
Figure 2:
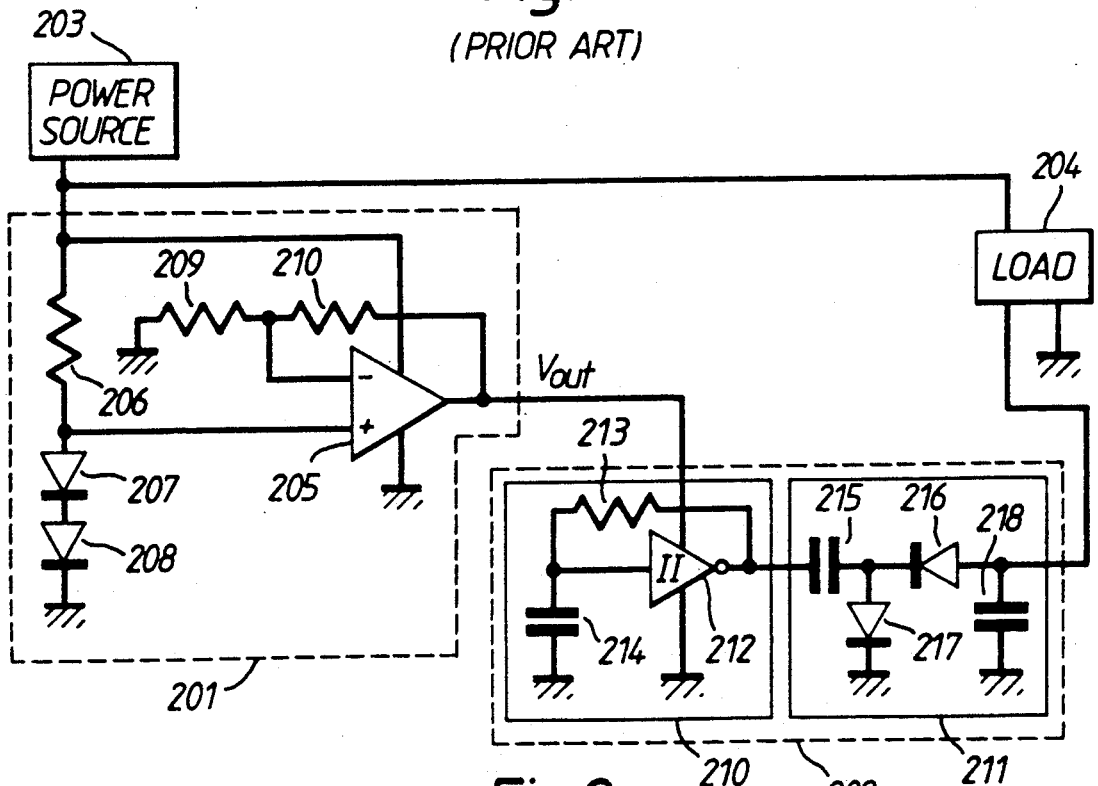
FIG. 2 is a block diagram of a voltage generator circuit in accordance with an embodiment of the present invention.

FIG. 2 is a block diagram of a voltage generator circuit in accordance with an embodiment of the present invention. The voltage generator circuit comprises a voltage regulator circuit 201 and a negative voltage generation circuit 202. Voltage (5 volts) from a power source 203 is appled to voltage regulator circuit 201 and is also applied to a load 204.

Voltage regulator 201 includes an operational amplifier 205 which receives power from source 203. A resistor 206 and two diodes 207 and 208 are connected in series between the 5 volt supply and ground. Diodes 207 and 208 provide a potential to one input of operational amplifier 205. The output of the operational amplifier is divided by resistors 209 and 210 and the divided potential is fed back to its input. The output of operational amplifier 205 is also supplied to negative voltage generation circuit 202. In this embodiment, voltage regulator circuit 201 generates a DC output out, which is less than the power source (i.e., 4 volts).

Negative voltage generation circuit 202 includes a pulse generator 210 and a voltage multiplier circuit 211. Pulse generator 210 is a non-stable multivibrator circuit comprising, for example, a CMOS device 212. CMOS device 212 receives power from the output (out) of voltage regulator 201. The output of CMOS device 212 is fed back to its input via resistor 213. A capacitor 214 is installed between the input of the CMOS 212 and ground. The output of CMOS device 212 is applied to voltage multiplier circuit 211.

Voltage multiplier circuit 211 comprises a capacitor 215, a diode 216 serially connected to capacitor 215, a diode 217 coupled between the output of capacitor 215 and ground, and a capacitor 218 coupled between the output of diode 216 and ground. Capacitor 215 and diode 217 pull down the potential level applied thereto. Diode 216 rectifies the applied signal, while capacitor 218 smooths the input signal applied thereto.

Figure 3:
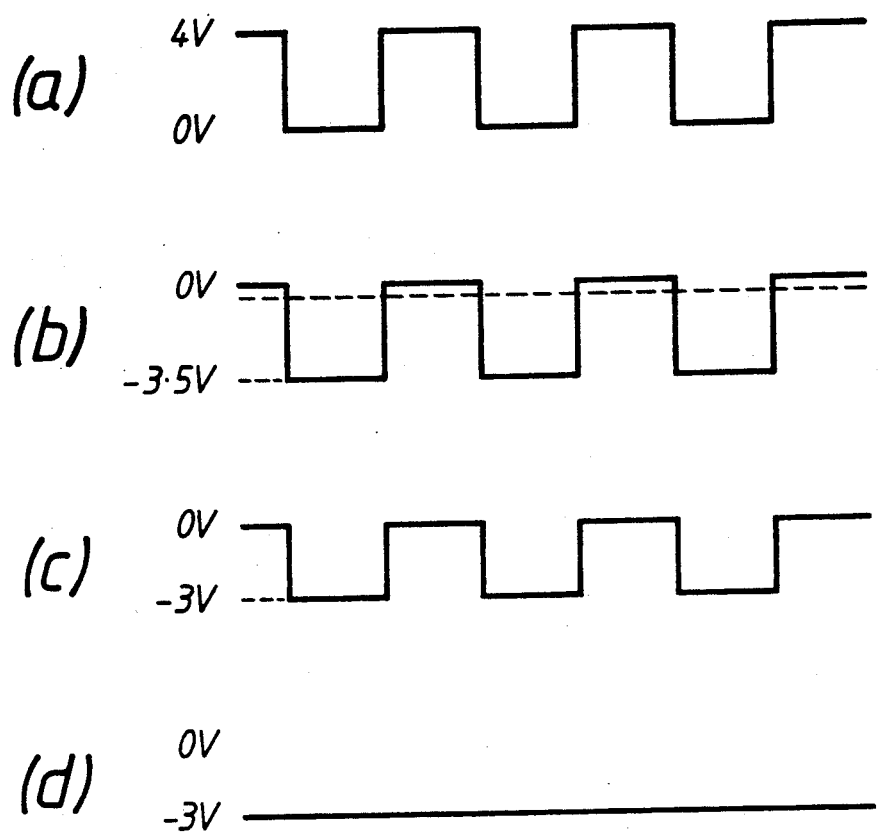
FIGS. 3(a)–(d) are timing diagrams showing the operation of the negative voltage generation circuit 202.

FIGS. 3(a)-3(d) are timing diagrams showing the operation of the negative voltage generation circuit 202. Shown in FIG. 3(a), is the output signal from the non-stable multivibrator circuit 210. Circuit 210 produces an oscillation pulse signal having a voltage varying between 4 to 0 volts. FIG. 3(b) shows the signal at the node between capacitor 215 and diode 216. Capacitor 215 pulls down the potential of its input signal by a magnitude of 4 V while diode 219 pulls up the potential by 0.5 volts (i.e., the potential across diode 216). Accordingly, the level of the signal shown in FIG. 3(a) is reduced by 3.5 volts as shown in FIG. 3(b). FIG. 3(c) shows the output signal from diode 216. Diode 216 pulls up the potential of its input signal and also cuts the signal component above 0 volts. The output of diode 216 is filtered by capacitor 218, as shown in FIG. 3(d), and is then applied to load 204.

Figure 4A:
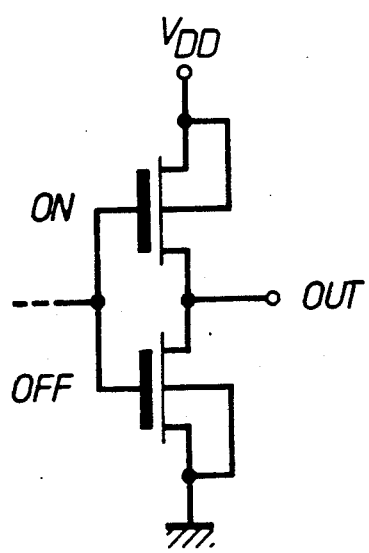
FIGS. 4(a) and (b) are block diagrams of a CMOS device used in the voltage generator circuit shown in FIG. 2.
Figure 4B:
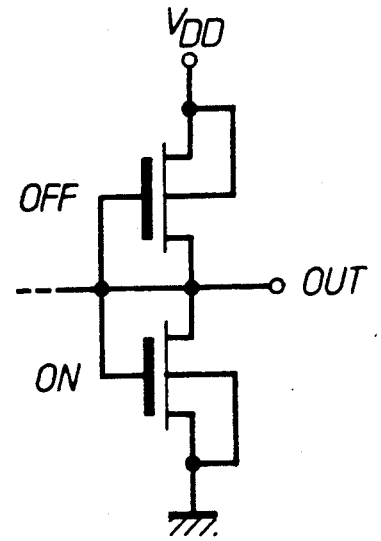
Figure 5:
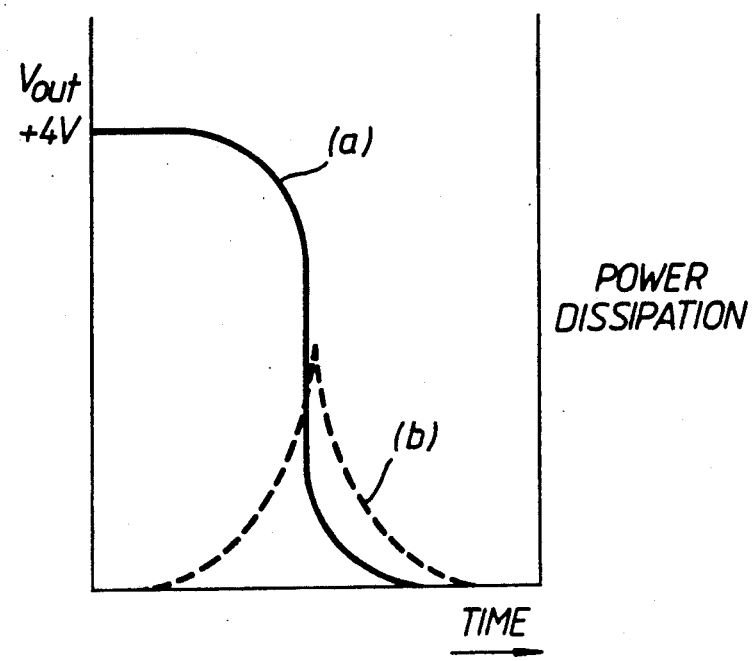
FIG. 5 is a graph showing the operational characteristics of the CMOS device.

FIG. 4(a) and (b) are block diagrams of the CMOS device 212 shown in FIG. 2, while FIG. 5 is a graph showing the operational characteristics of CMOS device 212 employing two switching elements 501 and 502. Curve (a) shows an output potential of the CMOS device 212 changing from its on to off-states, while curve (b) shows the magnitude of dissipation due to the closure of both switching elements 501 and 502.

CMOS device 212 comprises two switching elements 501 and 502, each of which consists of a field effect transistor (FET). Due to the charge/discharge operation of capacitor 214, one of the two switching elements is turned on while the other is alternately turned off. Accordingly, CMOS device 212 outputs an oscillation pulse signal. During this switching operation, as shown in FIG. 5, device 212 changes its output level. Accordingly, one of the switching elements is turned on and current flows through the switching elements from the power supply to ground, thereby dissipating power. The higher the voltage level applied to the device is, the greater the power dissipation. Since 4 volts, rather than 5 volts, from the voltage regulator 201 is applied to CMOS device 213, the dissipation is smaller than in a conventional voltage regulator.

Figure 6:
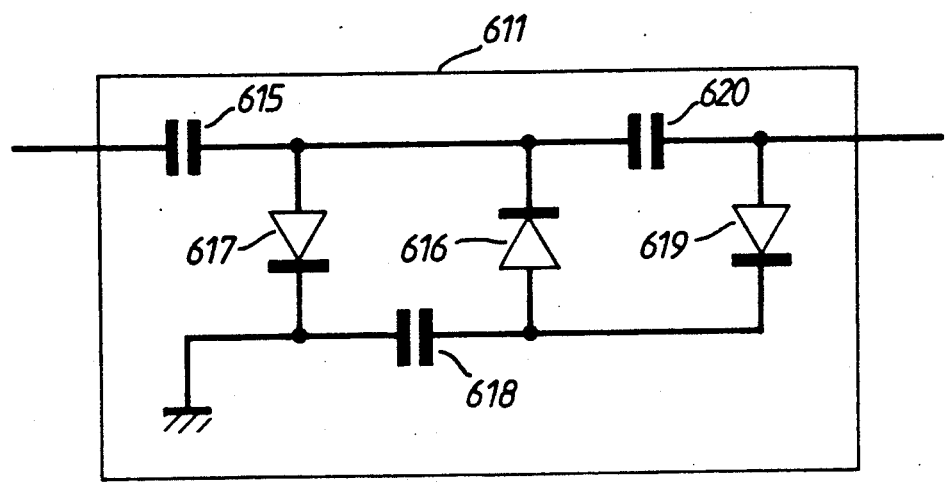
FIG. 6 is a block diagram of another embodiment of the voltage multiplier circuit.

FIG. 6 shows an alternative embodiment for a voltage multiplier circuit 211. In this embodiment, additional multiplying elements are provided in multiplier circuit 611: a capacitor 620 and a diode 619. Elements 620 and 619 are provided in addition to capacitors 615, 618 and diodes 616, 617 which function in a manner similar to capacitors 215, 218 and diodes 216, 217 in the multiplier circuit 211 of FIG. 2. According to the operation of voltage multiplier circuit 611, if a pulse signal oscillating between 4 volts and 0 volts is applied to the circuit, −6.5 volts will be generated.

Although the negative generation circuit described above inversely multiplies the voltage applied thereto for generating a negative voltage, positive voltage multiplication may be obtained by circuit 202. In that case, diodes 216, 217, 616, 617 and 618 in voltage multiplier circuits 211 and 611 would be installed in the reverse direction.

Although the negative voltage generation circuit described in the above embodiments receives 4 volts from voltage regulator circuit 201, regulator circuit 201 may be adjusted at any desired level by changing the values of resistors 209 and 210. As a result, the negative voltage level at the output of circuit 202 will likewise be adjusted.

While the above invention has been described with respect to an LCD circuit, the present invention can be used in other applications wherein a wide voltage range and a fixed voltage are needed while supplying a lower biasing voltage to reduce power consumption. For example, the invention can be used for driving a power amplifier circuit.

We claim:

1. A voltage generator circuit for providing a potential difference to a load, comprising:
   power source means for providing power at a first voltage level;
   voltage regulating means coupled to the power source means for providing a regulated output having a level maintained at a second voltage level, the second voltage level being lower than the first voltage level; and voltage generating means coupled to the regulated output for providing a multiplied output having a third voltage level corresponding to said potential difference.

2. The voltage generator circuit according to claim 1 wherein the power source means supplies an output to the load, whereby said potential difference corresponds to the difference between said first voltage level and said third voltage level.

3. The voltage generator circuit according to claim 1 wherein the voltage regulating means comprising an operational amplifier connected between an output of said power source and ground.

4. The voltage generator circuit according to claim 3 wherein a fourth voltage level divided from the first voltage level is applied to one input of the operational amplifier and a fifth voltage level divided from the output of the operational amplifier is applied to the other input of the operational amplifier.

5. The voltage generator circuit according to claim 1 wherein the voltage generating means comprises a non-stable multivibrator circuit for generating an oscillating pulse signal and a voltage multiplier circuit for providing an output having a voltage level depending on the level of the oscillating pulse signal.

6. The voltage generator circuit according to claim 5 wherein the non-stable multivibrator circuit comprises a semiconductor device having two switching elements electrically connected in series between the regulated output and ground, one of the switching elements being closed when the other switching element is opened, thereby the oscillating pulse signal is provided at a node between the two switching elements.

7. The voltage generator circuit according to claim 6 wherein the semiconductor device comprises a CMOS device.

8. The voltage generator circuit according to claim 5 wherein the voltage multiplier circuit comprises first capacitor means for pulling down the voltage applied thereto, at least one diode for rectifying the output of said first capacitor, and a second capacitor means for filtering the output of said one diode.

9. A voltage generator circuit for providing a potential difference to a load, comprising:
  power source means for providing an output having a first voltage level;
  voltage stabilizing means, coupled to the output of the power sources means, for providing a stabilized output having a second voltage level which is lower than the first voltage level;
  multivibrator means, coupled to the stabilizing means, for providing an oscillating pulse signal; and
  voltage multiplier means coupled to the oscillating pulse signal for providing to said load a multiplied output having a third voltage level.

10. The voltage generator circuit according to claim 9 wherein the power source output is applied to the load, whereby the potential difference corresponds to the difference between said first voltage level and said third voltage level.

11. The voltage generator circuit according to claim 9 wherein the multivibrator means comprises two switching means electrically connected in series.

12. The voltage generator circuit according to claim 11 wherein one of the switching means is closed when the other switching means is opened, whereby the oscillating pulse signal is provided from the multivibrator means.

13. The voltage generator circuit according to claim 12 wherein the multivibrator means is a CMOS device.

* * * * *